July 1, 1930. A. L. DUNCAN 1,769,664
FRUIT CORING AND STEM REMOVING METHOD AND APPARATUS
Filed March 26, 1927 3 Sheets-Sheet 1
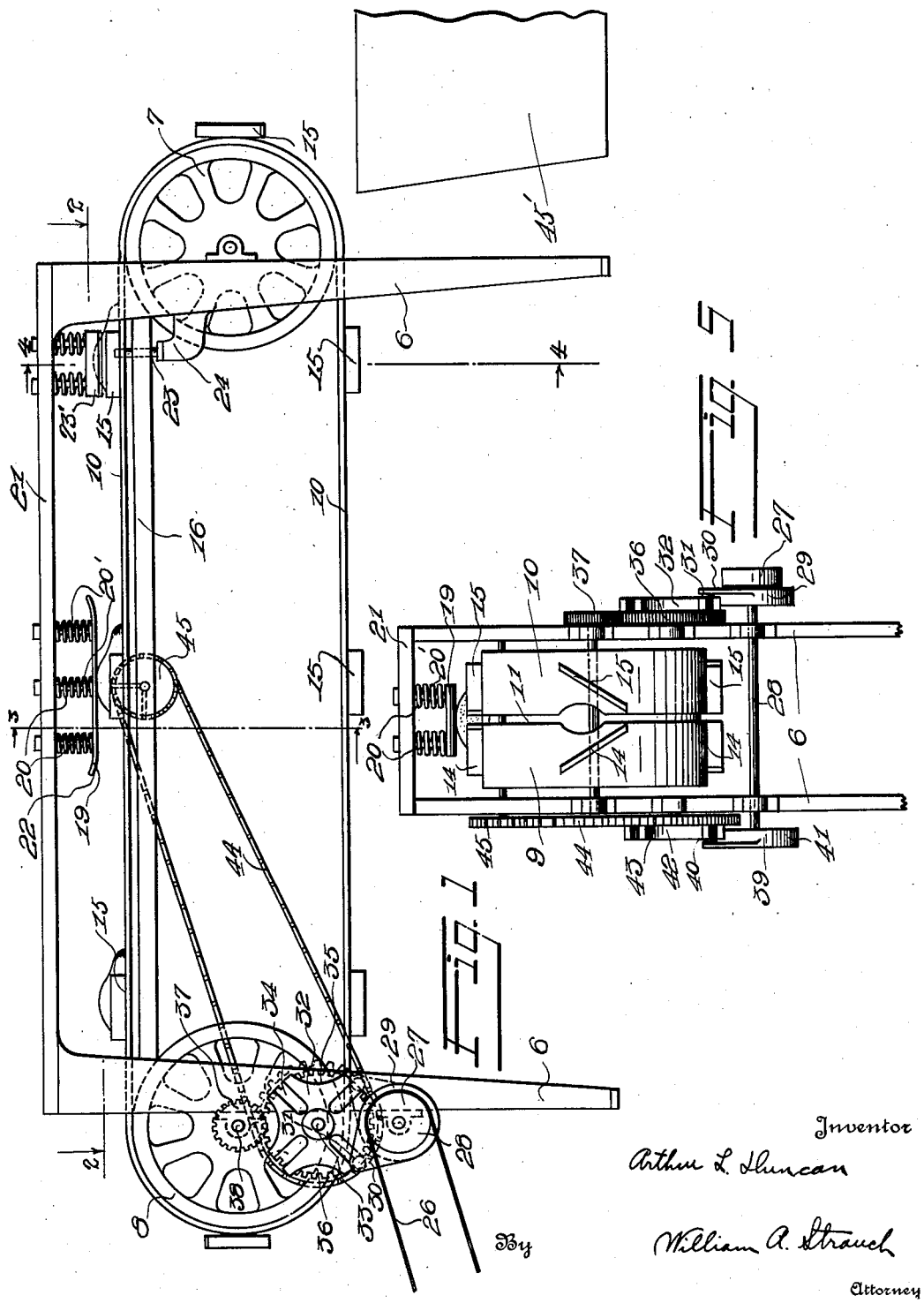
Inventor
Arthur L. Duncan
By William A. Strauch
Attorney

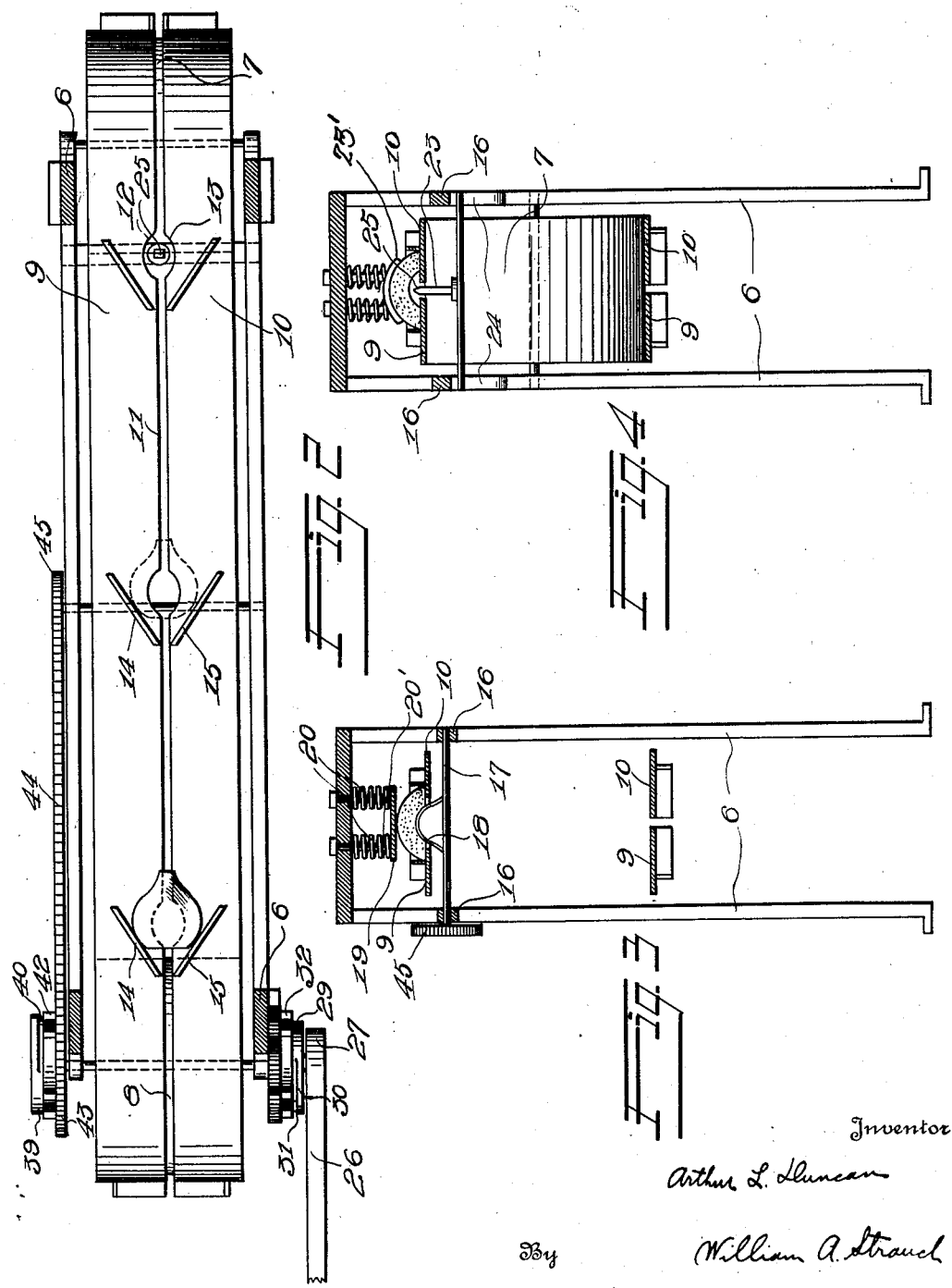

July 1, 1930.   A. L. DUNCAN   1,769,664
FRUIT CORING AND STEM REMOVING METHOD AND APPARATUS
Filed March 26, 1927   3 Sheets-Sheet 3
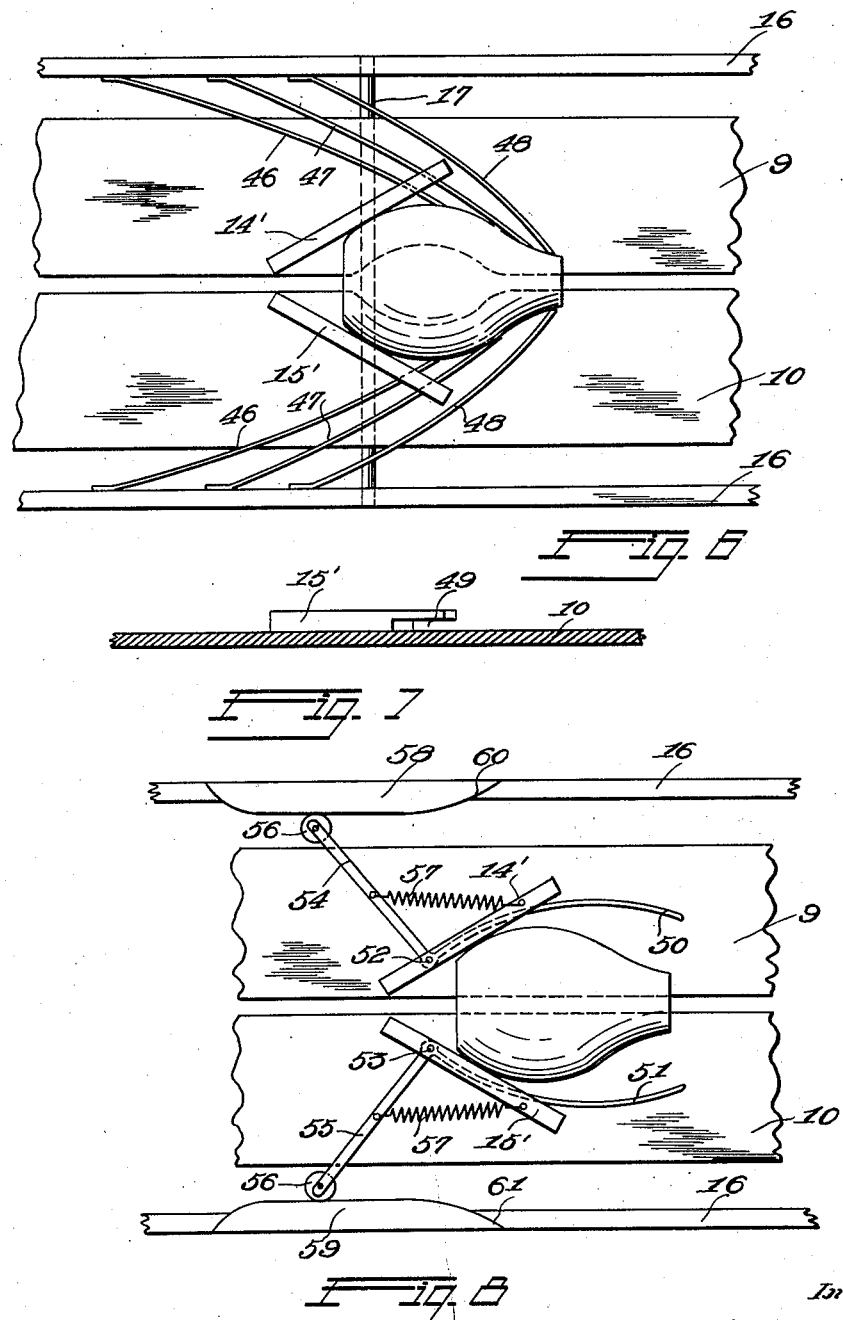
Inventor
Arthur L. Duncan
William A. Strauch
Attorney

Patented July 1, 1930

1,769,664

UNITED STATES PATENT OFFICE

ARTHUR L. DUNCAN, OF PIEDMONT, CALIFORNIA, ASSIGNOR TO ACME CANNING MACHINES COMPANY, OF RENO, NEVADA, A CORPORATION OF NEVADA

FRUIT-CORING AND STEM-REMOVING METHOD AND APPARATUS

Application filed March 26, 1927. Serial No. 178,575.

This invention relates to methods and apparatus for removing the cores and stems from fruit. More particularly the invention relates to methods and apparatus for coring and stemming fruits such as pears, apples and the like that have been cut into halves on longitudinal planes. It is the primary object of the invention to provide machines and methods to automatically perform the above mentioned operations with precision and with a minimum amount of handling by operatives. In applying the invention to coring and stemming pears, use is made of the observed fact that the core of a pear invariably occupies substantially the same position with respect to the blossom end of the fruit. Accordingly, if the pear is positioned with respect to that end it is entirely practicable to bring the fruit to correct position with respect to a core removing means.

A principal object of the invention is to provide apparatus and methods including the positioning of the fruit to be cored by bringing the blossom end into predetermined relation to a coring means.

Another object of the invention is to provide a pear coring machine in which the flesh of the half pear around the core is firmly supported while the core is being cut therefrom and which includes means to yieldingly press the pear half toward the coring means.

Still another object of the invention is to furnish a machine in which the fruit halves are automatically carried through a sequence of operations and then discharged, the services of an operator being required only to feed the halves to the machine.

A further object of the invention is to provide methods and apparatus for automatically removing the stem from fruit such as pears, apples, and the like.

Further objects of the invention will appear as the description of the invention proceeds with reference to the accompanying drawings in which, Figure 1 is an elevation of an embodiment of my invention in the use of which my improved method is employed.

Figure 2 is a horizontal section taken on the line 2—2 of Figure 1, certain of the pear halves being removed to show the core and stem removing means.

Figure 3 is a vertical section on the line 3—3 of Figure 1, the coring knife being shown in its uppermost position.

Figure 4 is a similar view on the line 4—4 of Figure 1.

Figure 5 is an end elevation of the machine viewed from the left end of Figure 1.

Figure 6 is a fragmentary plan view showing a modification including fruit centering and holding means.

Figure 7 is a sectional view showing the construction of the stops employed in the modification of Figure 6.

Figure 8 is a fragmentary plan view showing a further modification in which holding means that move with the stops are employed.

In the drawings, like numerals indicate like parts through the several views.

Rotatably supported on a suitable frame 6 are pulleys 7 and 8. Pulley 7 is an idle or guide pulley. Pulley 8 is preferably driven intermittently by means presently to be described, though it may be driven continuously if desired. Spaced endless belts 9 and 10 separated by a gap 11 pass around said pulleys. Belts 9 and 10 may be made of any suitable material. Matched substantially semi-circular recesses 12 and 13 are provided in belts 9 and 10. A number of such recesses are provided at equally spaced intervals along the belts, each interval corresponding to the travel of the belt during one cycle of the intermittently operating machine. Diverging fruit positioning stops 14 and 15 are arranged on belts 9 and 10 and secured thereto in any well known manner. Stops 14 and 15 are spaced apart a distance sufficient to accommodate the blossom end of a pear half between them and are so located with respect to the matched recesses 12 and 13 that when a pear half is placed between them the core thereof will be positioned above said recesses. The flesh of the pear half will be supported at the same time on the portions of the belts surrounding said recesses. Journaled in longitudinal frame members 16 (see Fig. 3) is a transverse shaft 17 having a curved knife 18 secured thereto. Knife 18 is proportioned and arranged to swing upwardly and rearwardly through the matched belt recesses to remove the core from the fruit when the latter is brought into position thereover. As shown, knife 18 forms a closed loop with shaft 17. If desired the knife may form an open loop with said shaft.

Arranged above knife 18 is a plate 19 held spaced above the belt and yieldingly pressed toward the belt by coil springs 20 surrounding bolts 20' that are adapted to slide vertically in suitable holes in longitudinal frame member 21, permitting vertical yielding movement of plate 19 with relation to the belts. The ends of plate 19 are turned upwardly as shown at 22 so that fruit of differing sizes may readily be brought into position beneath said plate.

A stem removing knife 23 in the form of a loop is secured to a bracket 24 carried by frame 6. The closed end of said loop is inverted V-shaped in end elevation as shown at 25 (Figure 4) which projects upwardly in the gap 11 between belts 9 and 10 and normally extends above the upper surface of the belts and into the path of movement of the stem of the properly positioned fruit halves.

In place of the stationary stem removing knife 23, a reciprocating knife having a looped form as shown on the drawings may be used. Such a knife would be mounted to slide on an elongated bracket, the slide being actuated by a suitable crank arm secured to knife shaft 17 and a suitable connecting link joining the end of said arm to the slide. In this way the stem would be removed at one station from one-half while the core is being removed at another station. The slide just referred to may be caused to be bodily retracted intermittently in which event the single belt having a plurality of longitudinally arranged key hole slots spaced equal distances may be used instead of the two spaced belts above described, the circular portion of said slot permitting the coring knife to have access to the fruit and the straight portion of the key hole slot permitting reciprocation of the stemming knife.

Arranged above the stem removing knife 23 is a plate 23' secured to longitudinal frame member 21 so that the plate presses yieldingly against the fruit halves, the construction whereby the yielding mounting of the plate is secured being the same as that used to yieldingly secure plate 19 to the frame of the machine as clearly shown on the drawings. Preferably, plate 23' is concave as viewed from below to increase the area of contact between this plate and the fruit. Plate 19 may be similarly made concave for the same purpose, if desired.

Power is transmitted to the machine by a belt 26 driven in any convenient manner and which passes around a pulley 27 secured to a shaft 28 journaled on the frame of the machine in any well known way. Secured to the pulley 27 is an inwardly flanged disk 29 carrying an arm 30 having a pin 31 secured thereto. A Geneva gear 32 is keyed to a shaft 33 carried by the frame. Said gear has radial slots 34 and locking depressions 35 designed to receive the flange on disk 29 to hold the mechanism at rest intermittently. Pin 31 engages radial slots 34 in succession rotating shaft 33 through one-fourth of a revolution. A large gear 36 secured to shaft 33 meshes with a smaller gear 37 keyed to the shaft 38 that carries the driven pulley 8, the arrangement being such that the pulley makes a full revolution for each quarter turn of gear 32.

Shaft 28 carries a second disk 39 having a pin 40 and a locking flange 41 engaging a second Geneva gear 42, of the construction above described. The pins 31 and 40 are angularly spaced about axis of shaft 28 so that pin 40 is entering a slot in gear 42 at the time pin 31 is leaving a slot in gear 32. In this way gears 42 and 32 are rotated intermittently in succession.

Secured to gear 42 is a large sprocket wheel 43 connected by a sprocket chain 44 to a sprocket 45 secured to shaft 17 before referred to.

In the operation of this machine above described, the operator takes the pear halves as they are delivered from the hand paring, halving, and trimming operators, or from the paring and halving machines. These halves are to have the core and stem ends removed or trimmed away either by hand or machine in planes transverse to the longitudinal axis of the pear. The operator places the halves in succession flatwise on belts 9 and 10, bringing the blossom end of the half against the diverging stops 14 and 15 and the stem section over gap 11 as shown in Figure 2. This will center the core of the pear over a set of matched recesses 12 and 13. The belts will carry the halves thus placed in succession to the coring station where the halves will pass beneath the member 19 which will firmly press the pear half on the belts. The intermittent belt feed will stop the belts with the matched recesses over the coring knife 18. The Geneva gear 42 that operates knife 18 is timed to rotate it while the gear 32 that actuates the belts maintains it at rest. Accordingly when the half arrives at the coring station and stops the coring knife will perform a complete revolution in the course of which it will enter the matched recesses and remove the core. A suitable inclined chute may be arranged beneath knife 18 to divert the removed core from the lower belt flight to a suitable waste receptacle.

The belts then move another step and as the half is moved toward the discharge end of the machine it is caused to be moved against stationary stemming cutter 23 that projects in its path and removes an inverted V-shaped cut including the stem from the pear half. As the rotation of the belt continues the cored and stemmed halves drop from the belt into a receptacle 45' provided to receive them.

It will be observed that the matched recesses 12 and 13 in belts 9 and 10 are arranged so that the coring knife 18 will move close to the edges of said recesses. This arrangement serves to firmly support the flesh of the half at the points where the core is cut and in this way contributes to the production of clean cut edges.

In order to center and hold the fruit half with its longitudinal axis extending in the direction of travel of the belt, the centering and holding means shown in Figure 6 may be used. In this modification of the invention, the stops 14' and 15' position the fruit on the belts as above described. At the coring station, however, a plurality of pairs of leaf springs 46, 47, and 48 are secured to the stationary side bars 16. The ends of said leaf springs press inwardly toward the longitudinal axis of the fruit, passing through recesses 49 cut in the stops 14' and 15' as shown in detail in Figure 7. The springs of each pair 46, 47 and 48 press inwardly with equal pressures. Accordingly as the fruit halves enter between said springs they will be centered accurately. At the same time the springs hold the fruit firmly from lateral movement during the coring operation.

In Figure 8 a further modification of a fruit holding means is shown. This modification may be used instead of that shown in Figures 6 and 7. In this form, spring arms that are inherently flexible, 50 and 51, are pivoted in recesses 49 of stops 14' and 15' on pins 52 and 53. Arms 54 and 55 are rigidly secured to spring arms 50 and 51 in any manner. Each arm 54 and 55 carries an anti-friction roller 56 mounted in the end thereof. Suitable coil springs 57 hold the spring arms firmly in contact with the fruit positioned by the stops 14' and 15'. When no fruit is so positioned the ends of the spring arms are normally in contact. In order to release the tension of springs 57 and retract the spring arms 50 and 51 at the feeding station, suitable stationary cams 58 and 59 are secured to frame members 16 adjacent said station. As will be readily understood, the engagement of rollers 56 with cams 58 and 59 as the belts approach the feeding station cause the springs 50 and 51 to separate permitting the fruit to be readily positioned against stops 14' and 15'. As the belts move toward the coring station the rollers 57 will ride off of the gradually rounded ends 60 and 61 of cams 58 and 59 thus causing the spring arms 50 and 51 to gently engage and thus center and hold the fruit from lateral movement during the subsequent operations. Suitable pins placed in the path of movement of the arms 54 and 55 will serve to release the spring arms 50 and 51 to discharge into receptacle 45' heretofore referred to.

The invention has been above described in some detail. However, the invention does not reside in such detail but the scope thereof is to be determined from the following claims.

I claim as my invention:

1. The method of coring fruit which comprises positioning the halves of the fruit so that the blossom end thereof assumes a definite relation to the path of movement of a coring knife, and then cutting a core section from the halved fruit by manipulating the knife to cause it to follow a predetermined path.

2. The method of coring pears, which comprises positioning the halves of the pear flatwise on a support so that the blossom end thereof assumes a definite relation to the path of movement of a coring knife, bearing on the half yieldingly to hold it in said definite relation and then cutting a core section from the halved pear by manipulating the knife in a path predetermined with respect to the definite position of the blossom end of the pear on said support.

3. That step in the method of coring a halved fruit which comprises positioning the halved fruit so that the blossom end thereof assumes a definite relation with respect to the predetermined fixed path of movement of a means to cut the core from said half.

4. That step in the method of cutting the core from a halved pear which consists in centering the pear half with respect to a coring means that follows a fixed predetermined path by locating said half with respect to the blossom end thereof.

5. The method of removing the core and stem of a halved pear which comprises positioning the blossom end of a halved pear in definite relation to the path of movement of a coring knife, removing the core while the half is held in said position and then removing the stem by moving the half with respect to a stem removing means.

6. The method of removing the stem of a cored and halved fruit which consists in moving the fruit half in a predetermined path in a direction parallel to the length of the stem and removing the stem by cutting around it as the half follows said path.

7. A pear coring machine comprising a perforated support for a halved pear, means on said support to position the blossom end of said pear half with respect to the perforation in said support, means to hold the pear half on said support with the core over said perforation, and means projecting through said perforation to remove said core.

8. A pear coring machine comprising a traveling support having a plurality of perforations therein approximately the outline of the core of a pear half, means on said support to position said half with the blossom end thereof in proper position with respect to said perforation, means to cause said support to bring the halves positioned thereon in succession to a coring station, and means at said station to project through said perforation and to remove the core from the half arranged thereover.

9. The combination defined in claim 8 in which the core removing means and the traveling support are actuated in timed relation.

10. A pear coring machine comprising a traveling belt provided with spaced openings approximating the outline of the core of a pear half, guides on said belt arranged to position the blossom ends of the pear halves in proper relation to said openings, means to move said belt to bring said openings in succession to a coring station, a yielding member at said station to hold said halves firmly from upward movement, and a curved coring knife at said station arranged to project upwardly through said openings to remove the core section from the halves.

11. A pear stemming machine including means to cause halved pears to move flatwise in a definite path, and a stationary stem removing knife having a cutting edge disposed substantially transversely of said path projecting into said path with its cutting edges projecting into said path in position to remove the stem as the half is caused to move thereover.

12. A fruit stemming machine comprising spaced belts to cause halved fruit disposed across the space between the belts to move in a definite path, and a loop-shaped stem removing knife projecting into the space between said belts and arranged to cut around the stem and remove it from the half as it moves over said knife.

13. The combination defined in claim 12 in which the stem removing knife is in the form of a loop with an inverted return bent tip having its cutting edge transverse to the line of travel of said belts.

14. A machine for trimming fruit comprising means to intermittently bring halved fruit to a coring station, a curved coring knife at said station arranged to swing upwardly and remove the core, and a stationary knife in position to remove a portion of the fruit half as it is being moved by said first named means from said coring station.

15. The combination defined in claim 14 in which the first named means includes belts passing over a pulley rotating on a horizontal axis whereby the fruit will be discharged when the belt passes from the upper to the lower surface of said pulley.

16. A machine for trimming a halved pear comprising a traveling support for the flat surface of the pear half, said support being provided with an opening closely surrounding said core, means to position the pear half on said support, means to yieldingly press the half toward said support, a curved coring knife mounted to swing through said opening, means to cause said support to move said pear-half away from said coring knife, and a stem removing knife arranged to remove the stem of the pear during said movement of the support from said coring knife.

17. The combination defined in claim 16 in which the positioning means includes a pair of diverging members arranged to engage the blossom end of the pear half.

18. A machine for cutting the core from a halved fruit comprising a traveling support, means to move said support to bring the fruit halves in succession to a coring station, stops to position the fruit on said support arranged to engage the blossom end of said fruit and a plurality of independently yielding centering and holding means engaging the sides of the fruit to center said fruit on the support and hold it from lateral movement.

19. A fruit machine comprising a traveling support arranged to carry fruit halves in succession to a plurality of stations, stops on said support to engage the blossom ends of the fruit halves to position the fruit on the support, and a plurality of independently yielding means cooperating with said stops and engaging the sides of the halves to center and hold the fruit halves from lateral movement.

20. A fruit machine comprising a traveling support, stops arranged in spaced relation on said support to position fruit thereon by bringing the fruit in contact with said stops, independently movable yielding centering and holding arms carried by said support in position to engage the sides of the fruit positioned by said stops and stationary means to retract said arms when the support reaches a feeding station.

21. A fruit coring machine comprising means to support halved fruit around the core flatwise on a substantially horizontally disposed surface; stationary means to yieldingly press the halves against said support, means to intermittently move said support to bring the halves successively beneath said stationary means, a curved cutter mounted for rotation about a substantially horizontal axis to completely cut the core from the halves while so supported, and means to rotate said cutter between the movement of said support.

22. A fruit coring machine comprising a flat perforated support for a halved fruit, means to yieldingly press a halved fruit against said support with the core thereof over a perforation in said support and a curved coring knife arranged beneath said support to swing about a single axis through said perforation to completely remove said core, and mechanism to successively move said support and swing said curved coring knife.

In testimony whereof I affix my signature.

ARTHUR L. DUNCAN.